Jan. 29, 1957

G. J. B. V. HEREIL ET AL 2,779,558

FUSELAGE OF AERODYNES

Filed April 3, 1953

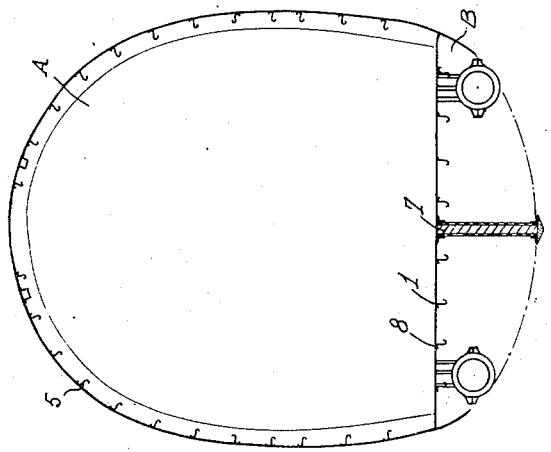
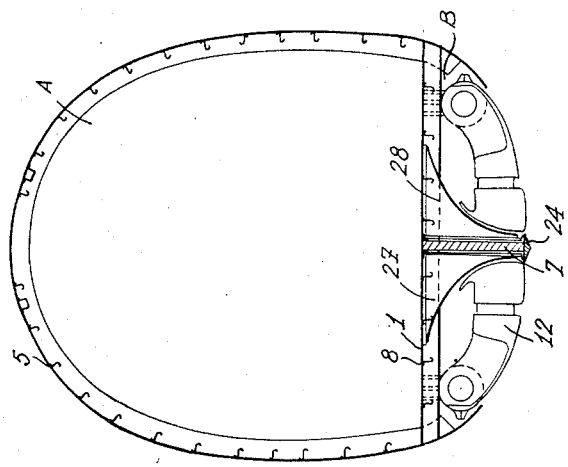
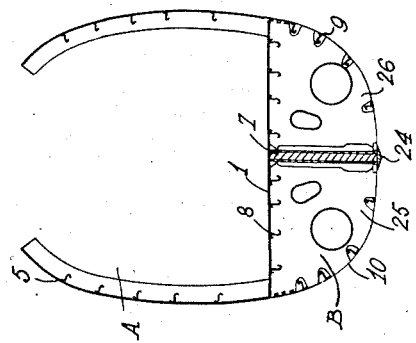

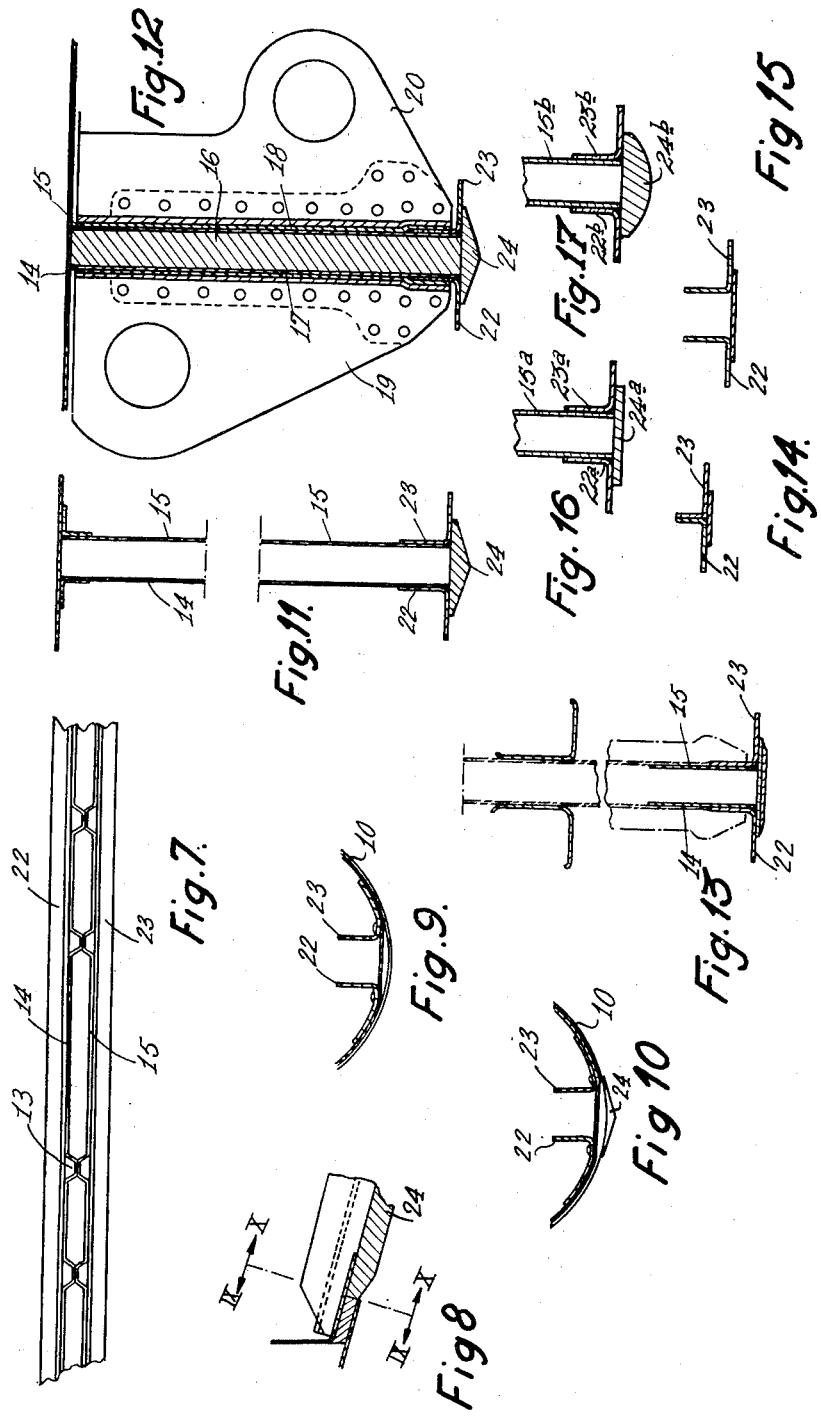

United States Patent Office 2,779,558
Patented Jan. 29, 1957

2,779,558

FUSELAGE OF AERODYNES

Georges Jules Bernard Victor Hereil and Wsiewolod John Jakimiuk, Paris, France, assignors to Societe Nationale de Constructions Aeronautiques du Sud-Est, Paris, France Application April 3, 1953, Serial No. 346,582

Claims priority, application France April 9, 1952

4 Claims. (Cl. 244—119)

The present invention relates to aerodynes either launched, or taking off by their own means, and adapted to leave the ground, a water surface or a floating craft and to land by means of wheel, ski or caterpillar undercarriages.

The invention is more particularly concerned with the fuselage structure of such aerodynes.

In conventional fuselage structure it is necessary to innerly strengthen the structure at selected points for resisting the handling loads, and the ground handling machines must catch the structure at these selected points in order to avoid injuries to the shell. Moreover, if an aircraft is forced to make a belly landing, each fuselage will be severely damaged and, in most cases, the aerodyne will crash.

The main object of the present invention is to provide on an aerodyne fuselage or hull means to permit ground handling without any risk of injury to the aerodyne fuselage and without being restricted to particularly selected bearing points when lifting up the aerodyne through the fuselage.

For this purpose, the fuselage for aerodyne according to the present invention is characterised by the fact that it is provided along the greatest part of its bottom extending from the nose toward the rear part with a lower central girder disposed in the longitudinal plane of symmetry of the fuselage for acting as reinforcing member for said fuselage with a view to allow the use of conveying devices bearing under said girder at any point or points of the same.

Thus, handling of the aerodyne on the ground is made easier, since, for any handling operation, the aerodyne may be simply lifted up, without any risk of distortion, with the aid of a cross-beam bearing at any point of the reinforcing longitudinal girder.

The fuselage structure according to the invention is different from the hull structure used heretofore in the construction of flying boats. These hulls usually comprise a central keelson which cooperates with two symmetrical series of side keelsons for supporting hydrodynamically designed forms, said series of side keelsons terminating with two marginal keelsons which serve for supporting the flying boat on conveying carriages.

One embodiment of this invention will now be described by way of example, reference being made in the description to the accompanying drawings, in which:

Figure 4 is a section of Fig. 1 on line IV—IV.

Figure 5 is a section of Fig. 1 on line V—V.

Figure 6 is a section of Fig. 1 on line VI—VI, without a landing gear.

Figure 7 is a partial plan view, at a greater scale, showing how the central reinforcing longitudinal girder of the fuselage illustrated in Fig. 1 is built up.

Figure 8 is a detail, at a greater scale, showing the attachment of the front end of the reinforcing girder to the aerodyne structure.

Figures 9 and 10 are respectively a front view and a back view of a section taken on line IX—IX of Fig. 8.

Figure 11 is a section of the reinforcing girder at a greater scale, taken on line XI—XI of Fig. 2.

Figure 12 is a section of the reinforcing girder at a greater scale, taken on line XII—XII of Fig. 2.

Figure 13 is a section of the reinforcing girder at a greater scale, taken on line XIII—XIII of Fig. 2.

Figure 14 is a section of the reinforcing girder at a greater scale, taken on line XIV—XIV of Fig. 2.

Figure 15 is a section of the reinforcing girder at a greater scale, taken on line XV—XV of Fig. 2.

Figure 16 is a view similar to the lower part of Fig. 11, the reinforcing longitudinal element being flat.

Figure 17 is a view similar to the lower part of Fig. 11, the reinforcing longitudinal element being outwardly rounded.

Figure 1:
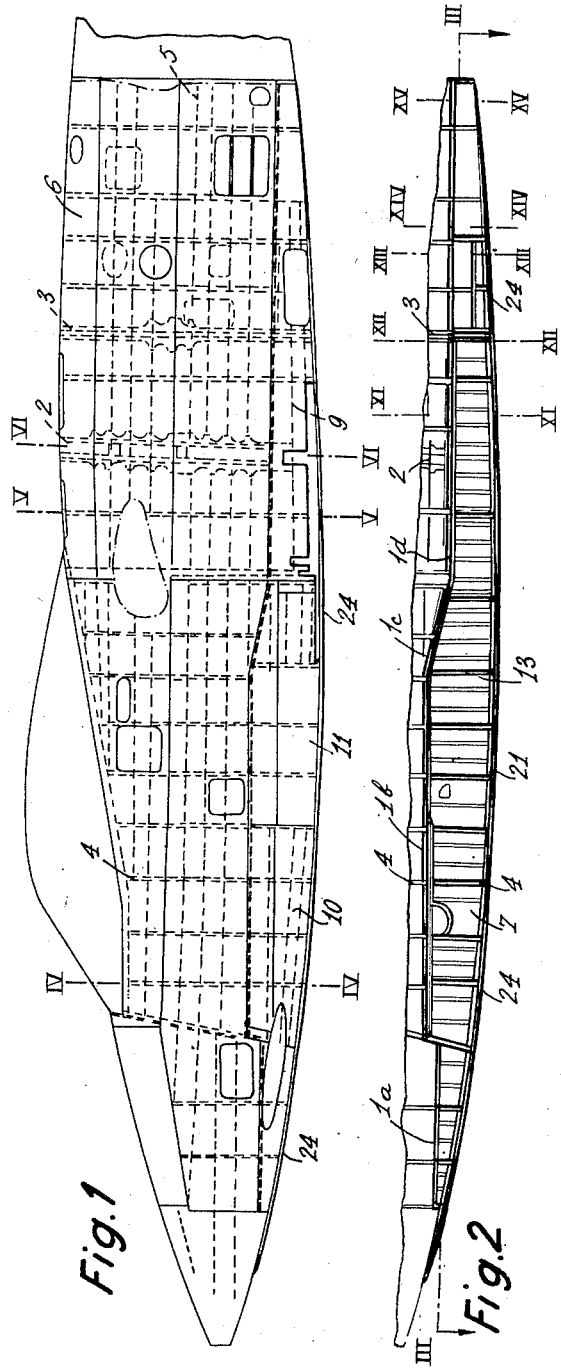
Figure 1 is a partial elevational outer view of an aerodyne fuselage according to the invention.
Figure 2:
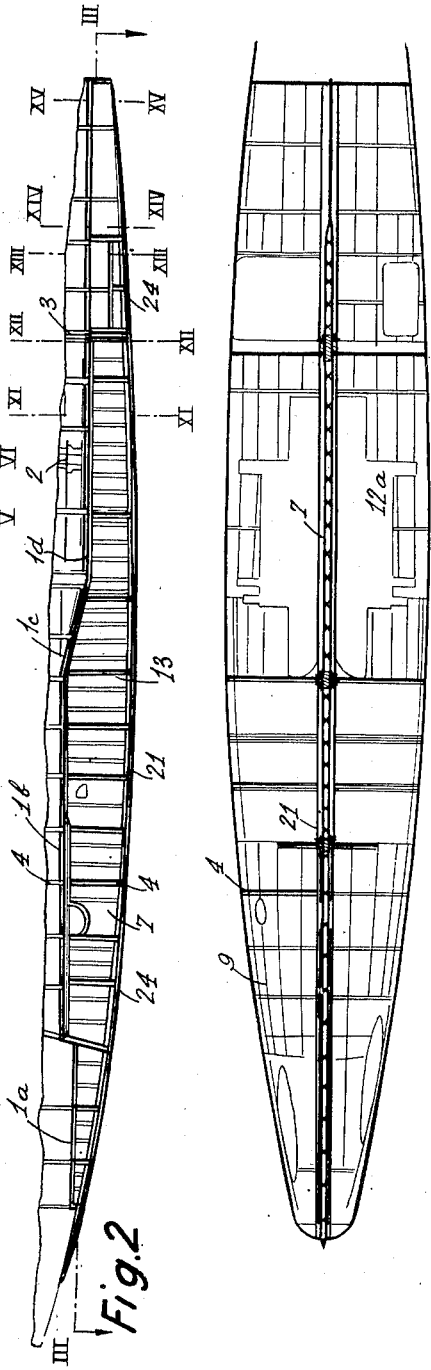
Figure 2 is a partial view, the outer skin being cut away, of the central reinforcing longitudinal girder provided in the fuselage structure illustrated in Fig. 1.
Figure 3:
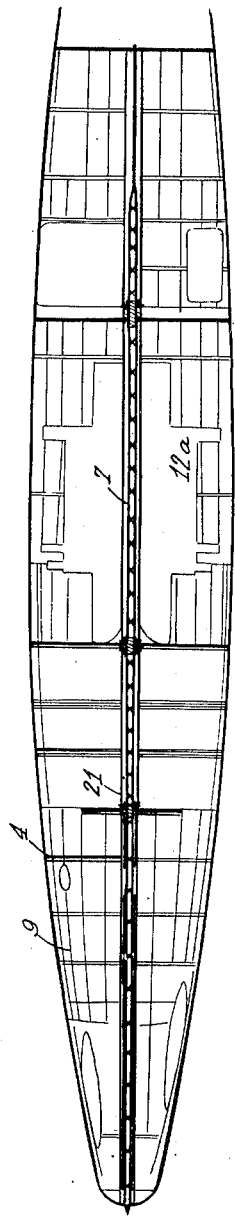
Figure 3 is a section of the fuselage taken on line III—III of Fig. 2.

The fuselage illustrated in Figs. 1 to 6 is of the monocoque type with load-supporting shell. Throughout the accommodated part of this fuselage, that is from the front end to the rear third of its length, this fuselage is divided into two superposed compartments A and B (Figs. 4 to 6) separated from each other by a floor 1.

The compartment A, which has the greater volume and is above the floor 1, is formed by a conventional monocoque structure. This structure comprises strong transverse frames, such as frames 2 and 3 provided with wing attachment features, not shown, and medium strength transverse frames or rings 4 spaced along the fuselage. These strong and half-strong frames carry longitudinal ribs 5 circumferentially spaced around the fuselage. The shell plating 6 formed with suitable openings for the necessary inlets or for the outlet of implements such as arms or equipments, is secured to the ribs 5 and the frames 2, 3, 4 which present for the purpose surfaces conformable to the outer shape of the fuselage.

The compartment B under the floor is substantially smaller than compartment A. Its structure mainly comprises a central reinforcing lower girder 7 arranged in the longitudinal centerplane of the fuselage. This structure comprises, in addition, substantially horizontal ribs 8 disposed under the floor and longitudinal ribs 9 resting on some of the frames, such as frame 4 extending beneath the floor, or on portions of frames extending beneath the floor. The outer wall of this compartment B is formed partly by the covering sheet metal 10, partly by panels 11 serving as doors or mounted on removable elements, partly by the outer covering of the landing gear 12 which, in the illustrated example, is of the kind described in the U. S. patent application Serial No. 341,267, filed on March 9, 1953, now U. S. Patent No. 2,741,446, for: "Improvements in or Relating to Aircraft Landing Gears" in the name of Jakimiuk assigned to Société Nationale de Constructions Aéronautiques du Sud-Est, the skin being then provided with an opening 12a for the passage of the landing gear.

The central reinforcing girder 7 of the illustrated embodiment extends between the floor 1 and the outer shell of the fuselage. Said girder is made of section members and comprises a double web of embossed sheet metal 14, 15 (Figs. 7, 11, 12, 13) stiffened by sections 13 and, at the location of the frames, by fillers 16 in light metal secured to the flanges 17, 18 of the sections of the frame and to bracing angle-plates 19, 20 (Fig. 12).

The central reinforcing girder is also provided with a lower flange member 21 (Figs. 2, 3) built up of two angles 22, 23 (Figs. 9 to 15) and conforming to the bottom line of the shell throughout its length. This flange member carries a longitudinal thick element 24 projecting outside the covering (Figs. 1, 2 and 10 to 12). This longitudinal element is externally V-shaped. It may also have a flat or slightly rounded section as illustrated in Figs. 16 and 17, respectively. This element is secured to the lower flange member in any known way, such as riveting for example.

The central reinforcing girder may be formed lengthwise of several pieces fixed to strong frames which, preferably, extend under the floor. The floor level may vary along the central reinforcing girder as shown at 1a, 1b, 1c, 1d in Fig. 2, according to the accommodation to be provided by the upper compartment A or the lower compartment B, in particular for housing the landing gear elements under the portions 1c, 1d of the floor, as shown in Figs. 5, 6, or pieces of equipment or armament, under the portion 1b for example.

The main frames that extend under the floor maintain the central reinforcing girder 7 against warping. In places deprived of such frames, cross members as shown in Figs. 5, 6 are provided for bracing the central reinforcing girder transversely. In Fig. 4 showing a cross-section adjacent a frame cut at the floor to permit armament accommodation, two side plates or center members 25, 26 are secured underneath the floor to ensure the transverse bracing of the central reinforcing girder 7. In the cross-section shown in Fig. 5, which is made adjacent an intermediate frame cut at the floor to permit of arranging the housing of the landing gear when retracted, the central reinforcing girder 7 is transversely braced by brackets 27, 28.

Except for the panels which are carried by removable parts, such as 11, and the landing gear 12, the covering sheet metal 10 of the fuselage is supported by the ribs 9 which bear on frames or portions of frames.

The central reinforcing girder thus transversely braced by full frames 4, side plates such as 25, 26 and brackets such as 27, 28, takes part in the resistance of the whole fuselage in any working conditions of the latter and, more particularly, during handling operation on the ground or when loaded on a conveying or launching carriage.

Of course, without departing from the scope of the invention, modifications could be made to the above embodiment.

This reinforcing girder may be used in a wood constructed aerodyne, as well as in an aerodyne having a monocoque structure, that is a metal structure with a load-resisting shell.

What we claim is:

1. In a fuselage for aerodynes of the type comprising an upper compartment, a lower compartment extending under said upper compartment, the volume of which is substantially less than that of said upper compartment and which is formed with at least one room, a floor separating said compartments, and a conventional monocoque structure constituted by strong transverse frames forming structure elements for said two compartments, series of transverse frames of medium strength interrupted beneath the floor for accommodating the lower compartment and forming structure elements only for the upper compartment, and transverse frames of medium strength forming structure elements for said two compartments and disposed between said series of interrupted transverse frames; the improvement which comprises a reinforcing central girder housed in the lower compartment, disposed in the longitudinal plane of symmetry of the fuselage, extending at least under said compartments, bearing on the floor and on the fuselage along its bottom line contained in said plane while projecting from the latter, said girder being constituted by a number of sectional pieces rigidly secured to the parts of the strong transverse frames which form the structure of said lower compartment and rigidly connected with said floor, a thick reinforcing longitudinal element rigidly secured under the projecting part of said girder, and means for transversely maintaining said reinforcing central girder in places where the frames of medium strength are interrupted beneath the floor.

2. The fuselage, according to claim 1, wherein the means for transversely maintaining the reinforcing central girder comprises, at least on one side of said girder, center members secured under the floor and on the girder and on which bear the skin of the fuselage.

3. A fuselage, according to claim 1, wherein the means for transversely maintaining the reinforcing central girder comprises, at least on one side of the girder, brackets secured on said girder and under a reinforced part of the floor.

4. A fuselage, according to claim 1, further comprising vertical stiffeners secured on either side of the reinforcing central girder substantially in register relationship with the transverse frames of high and medium strengths.

References Cited in the file of this patent

UNITED STATES PATENTS

| | | |
|---|---|---|
| 1,541,976 | Longren | June 16, 1925 |
| 1,859,807 | Stout | May 24, 1932 |
| 2,111,326 | Norris | Mar. 15, 1938 |
| 2,125,690 | Ragsdale et al. | Aug. 2, 1938 |
| 2,185,475 | Rafter | Jan. 2, 1940 |
| 2,342,023 | Vidal et al. | Feb. 15, 1944 |
| 2,500,015 | Tweney | Mar. 7, 1950 |

FOREIGN PATENTS

| | | |
|---|---|---|
| 119,585 | Australia | Feb. 14, 1945 |
| 318,053 | Italy | June 1, 1934 |
| 457,105 | France | July 4, 1913 |

OTHER REFERENCES

A. P. C. application of Dornier, Ser. No. 283,962, published May 25, 1943.